(12) United States Patent
Thakker et al.

(10) Patent No.: US 11,507,841 B2
(45) Date of Patent: Nov. 22, 2022

(54) HARDWARE ACCELERATOR FOR NATURAL LANGUAGE PROCESSING APPLICATIONS

(71) Applicant: Arm Limited, Cambridge (GB)

(72) Inventors: Urmish Ajit Thakker, Austin, TX (US); Ganesh Suryanarayan Dasika, Austin, TX (US)

(73) Assignee: Arm Limited, Cambridge (GB)

( * ) Notice: Subject to any disclaimer, the term of this patent is extended or adjusted under 35 U.S.C. 154(b) by 468 days.

(21) Appl. No.: 16/786,096

(22) Filed: Feb. 10, 2020

(65) Prior Publication Data

US 2021/0248008 A1  Aug. 12, 2021

(51) Int. Cl.
*G06N 3/063* (2006.01)
*G06T 1/20* (2006.01)
*G06N 3/08* (2006.01)
*G06F 40/40* (2020.01)
*G06T 1/60* (2006.01)

(52) U.S. Cl.
CPC .......... *G06N 3/084* (2013.01); *G06F 40/40* (2020.01); *G06N 3/063* (2013.01); *G06N 3/082* (2013.01); *G06T 1/20* (2013.01); *G06T 1/60* (2013.01)

(58) Field of Classification Search
CPC .. G06F 40/40; G06T 1/20; G06T 1/60; G06N 3/063; G06N 3/082

USPC .................................... 345/503, 531, 536
See application file for complete search history.

(56) References Cited

U.S. PATENT DOCUMENTS

| | | | |
|---|---|---|---|
| 10,698,657 B2 * | 6/2020 | Kang | G06N 3/063 |
| 11,175,919 B1 * | 11/2021 | Minkin | G06F 13/28 |
| 2018/0046900 A1 * | 2/2018 | Dally | G06F 9/30018 |
| 2019/0286973 A1 * | 9/2019 | Kowuri | G06N 3/04 |

* cited by examiner

*Primary Examiner* — Jacinta M Crawford
(74) *Attorney, Agent, or Firm* — Leveque Intellectual Property Law, P.C.

(57) ABSTRACT

The present disclosure advantageously provides a hardware accelerator for a natural language processing application including a first memory, a second memory, and a computing engine (CE). The first memory is configured to store a configurable NLM and a set of NLM fixed weights. The second memory is configured to store an ANN model, a set of ANN weights, a set of NLM delta weights, input data and output data. The set of NLM delta weights may be smaller than the set of NLM fixed weights, and each NLM delta weight corresponds to an NLM fixed weight. The CE is configured to execute the NLM, based on the input data, the set of NLM fixed weights and the set of NLM delta weights, to generate intermediate output data, and execute the ANN model, based on the intermediate output data and the set of ANN weights, to generate the output data.

20 Claims, 10 Drawing Sheets

HARDWARE ACCELERATOR FOR NATURAL LANGUAGE PROCESSING APPLICATIONS

BACKGROUND

The present disclosure relates to computer systems. More particularly, the present disclosure relates to computer systems that include neural networks.

Artificial neural networks (ANNs), such as convolutional neural networks (CNNs), are a popular solution to a wide array of challenging classification and recognition tasks. Recurrent neural networks (RNNs) are particularly suited for natural language applications, such as, for example, sentiment analysis, speech recognition, reading comprehension, summarization and translation, etc., as well as certain image processing applications, such as, for example, image captioning, video classification, etc. Natural language applications may include an ANN model, such as an RNN model, a CNN model, etc., and a pre-trained language model (LM), which may be incorporated directly into the ANN model or provided as a separate model.

In certain situations, several related natural language applications may be designed to run on a single device that has an ANN hardware accelerator. Each ANN model begins training with the same version of the pre-trained LM. During training, the weights of the ANN model are updated and certain LM weights are adjusted to finetune the pre-trained LM to the particular task performed by that ANN model. After training, each natural language application includes a trained ANN model and a uniquely-trained LM, which may be stored in the memory of the ANN hardware accelerator or in system memory. Even though the topology of each uniquely-trained LM is the same and the differences between each set of uniquely-trained LM weights are small, the memory required to store all of the uniquely-trained LMs and their corresponding weights may become excessively large.

DETAILED DESCRIPTION

Figure 1:
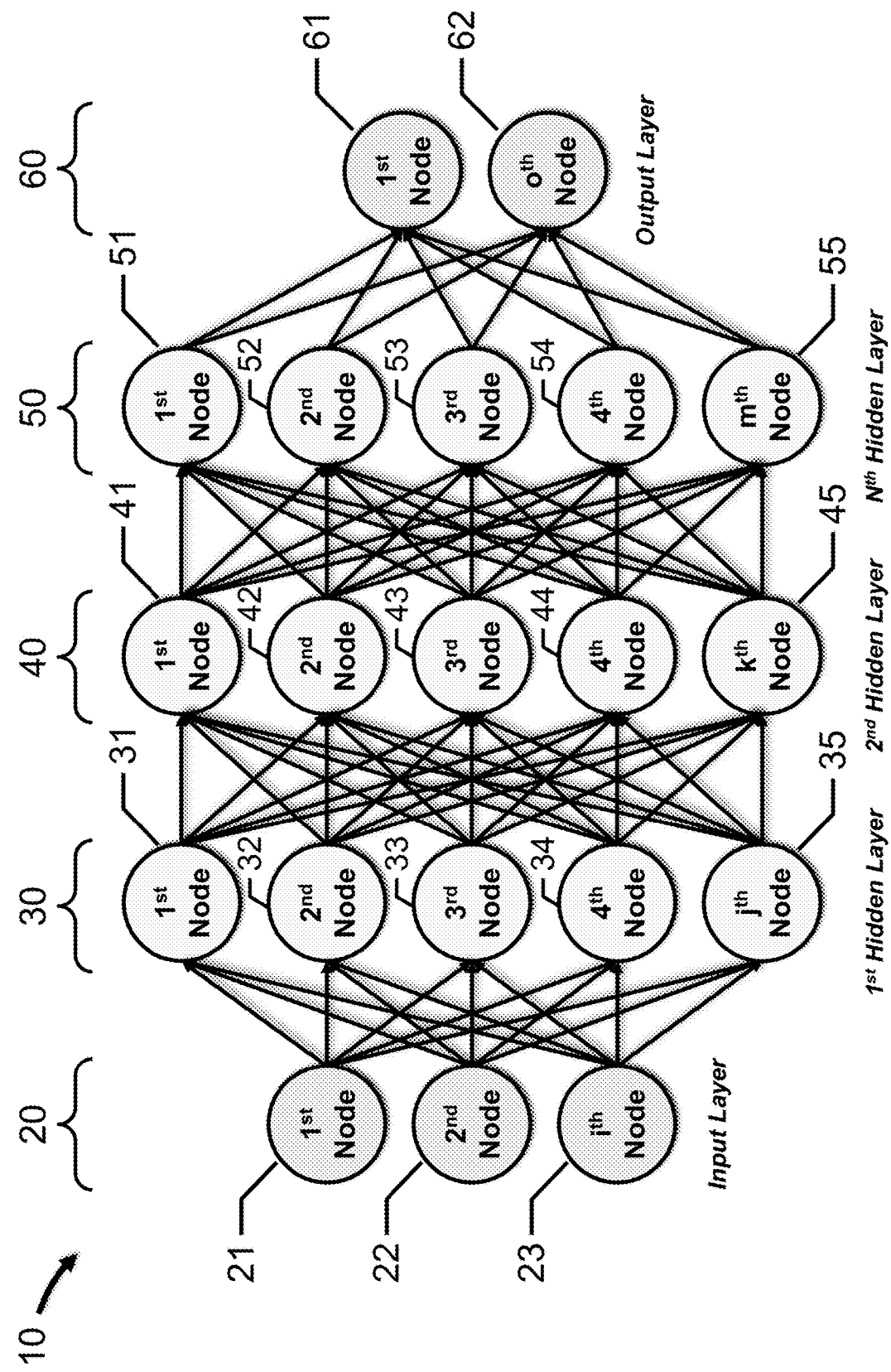
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide an ANN hardware accelerator for natural language processing applications that stores and executes a configurable NLM. More particularly, the ANN hardware accelerator stores the configurable NLM and a set of NLM fixed weights in non-volatile memory. During execution of a natural language processing application, the ANN model, ANN weights and a set of associated NLM delta weights are downloaded from system memory to volatile memory on ANN hardware accelerator. During execution of the configurable NLM on the ANN hardware accelerator, the configurable NLM is finetuned to the ANN model by adjusting the NLM fixed weights using the set of associated NLM delta weights.

Advantageously, each natural language processing application does not need to store an associated, memory-intensive, uniquely-trained LM in system memory and then download the uniquely-trained LM to the ANN hardware accelerator. Instead, only the much smaller set of associated NLM delta weights are stored in system memory and downloaded to the ANN hardware accelerator, which reduces the overall system storage requirements for multiple natural language processing applications. Furthermore, during execution of multiple natural language processing applications, memory-intensive, uniquely-trained LMs do not need to be individually downloaded to the ANN hardware accelerator for each natural language processing application, which significantly and advantageously consumes less energy, requires less time, and improves the runtime efficiency during inference.

In alternative embodiments of the present disclosure, during execution of a first natural language processing application, a first ANN model, a first set of ANN weights, a first set of associated NLM delta weights, the configurable NLM and the set of NLM fixed weights are downloaded from system memory to volatile memory on the ANN hardware accelerator. During execution of the configurable NLM on the ANN hardware accelerator, the configurable NLM is finetuned to the first ANN model by adjusting the NLM fixed weights using the first set of associated NLM delta weights. Advantageously, once the configurable NLM and NLM fixed weights are downloaded from system memory to volatile memory on the ANN hardware accelerator, during the execution of a successive natural language processing application, only the successive ANN model, ANN weights and associated NLM weights need to be downloaded. During execution of the configurable NLM on the ANN hardware accelerator, the configurable NLM is finetuned to the successive ANN model by adjusting the NLM fixed weights using the successive associated NLM delta weights. In other words, the configurable NLM and NLM fixed weights only need to be downloaded once from system memory to volatile memory on the ANN hardware accelerator.

In one embodiment, an ANN hardware accelerator for a natural language processing application includes a communication bus interface, a first memory, a second memory coupled to the communication bus interface, a controller coupled to the communication bus interface, the first memory and the second memory, and at least one computing engine (CE) coupled to the first memory, the second memory and the controller.

The communication bus interface is configured to receive an ANN model, a set of ANN weights, a set of NLM delta weights associated with the ANN model, and input data, and transmit output data.

The first memory is configured to store a configurable NLM and a set of NLM fixed weights. The second memory is configured to store the ANN model, the set of ANN weights, the set of NLM delta weights, the input data and the output data. Each NLM delta weight corresponds to an NLM fixed weight.

In one embodiment, the CE is configured to execute the NLM, based on the input data, the set of NLM fixed weights and the set of NLM delta weights, to generate intermediate output data, and execute the ANN model, based on the intermediate output data and the set of ANN weights, to generate the output data. In another embodiment, the CE is configured to execute the ANN model, based on the input data and the set of ANN weights, to generate the intermediate output data, and execute the NLM, based on the intermediate output data, the set of NLM fixed weights and the set of NLM delta weights, to generate the output data.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLu) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

FIG. 1 depicts an ANN, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), sequence-to-sequence models that include an encoder RNN and a decoder RNN, long short-term memories (LSTMs), gated recurrent units (GRUs), memory-augmented neural networks (MANNs), transformer neural networks, shallow neural networks, etc.

Figure 2:
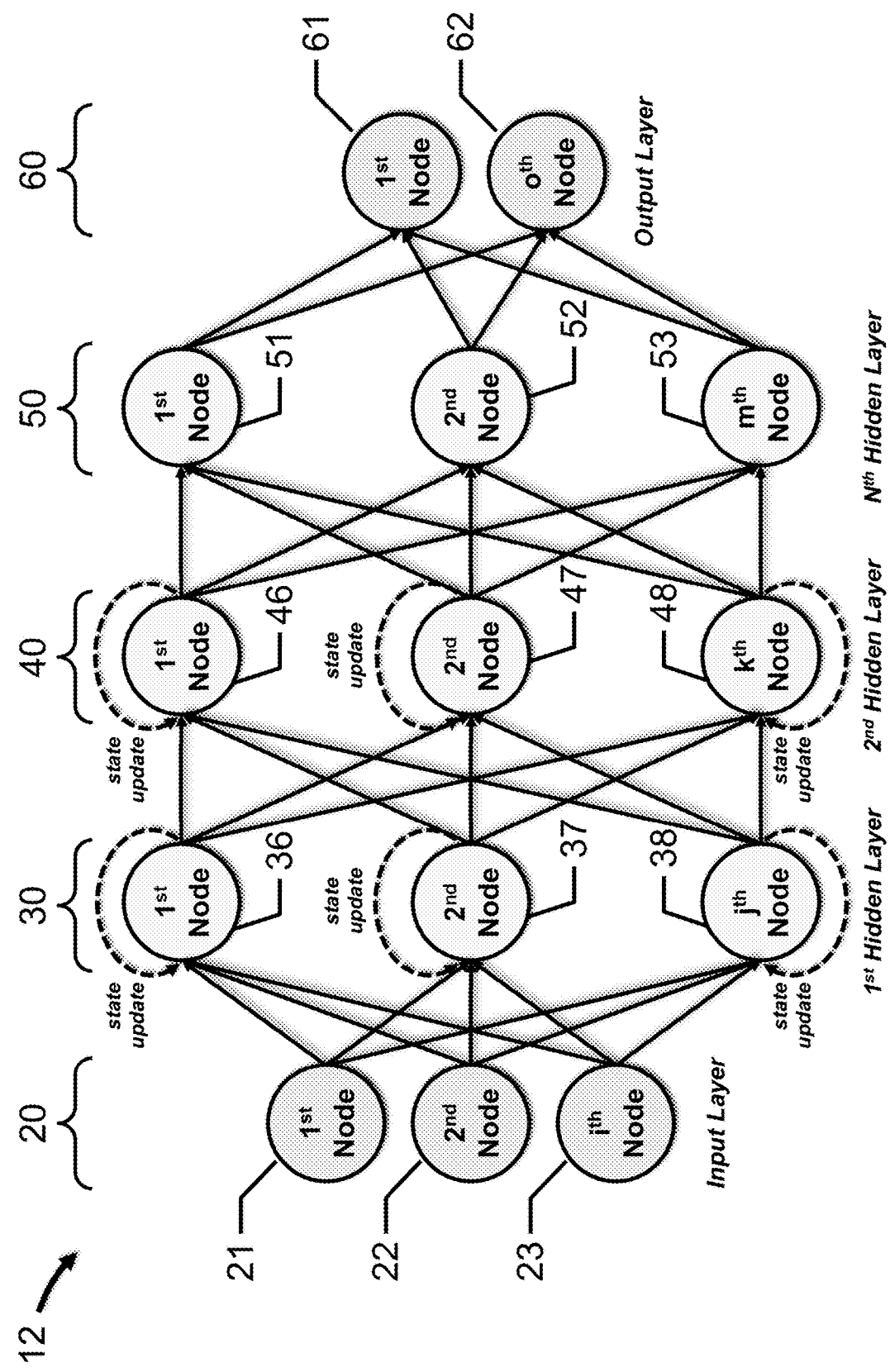
FIG. 2 depicts a recurrent neural network (RNN), in accordance with an embodiment of the present disclosure.

FIG. 2 depicts an RNN, in accordance with an embodiment of the present disclosure. Generally, RNNs process input sequence data and generate output sequence data, and may be used for many different applications, such as, for example, natural language processing applications (e.g., sentiment analysis, speech recognition, reading comprehension, summarization and translation, etc.), image processing (e.g., image captioning, video classification, etc.), etc. RNNs may be programmed to process many different types of input and output data, such as, for example, fixed input data and fixed output data for image classification, etc., fixed input data and sequential output data for image captioning, etc., sequential input data and fixed output data for sentence "sentiment" classification, etc., sequential input data and sequential output data for machine translation, etc., synced sequential input data and sequential output data for video classification, etc.

RNN 12 includes input layer 20, one or more hidden layers, such as recurrent layer 30, one or more additional recurrent layers 40, hidden layer 50, etc., and output layer 60. Many other variations of input, hidden and output layers are contemplated.

Input layer 20 includes one or more input nodes 21, 22, 23, etc., that presents the input data, such as sequences of letters, words, sentences, etc., images, audio data, etc. to hidden layer 30.

Hidden layer 30 is a fully connected, recurrent layer that includes one or more recurrent nodes 36, 37, 38, etc. Each hidden (recurrent) node 36, 37, 38, etc. maintains a state or hidden vector, which is updated at each time step (t) of RNN 12. Generally, each recurrent node updates its state or hidden vector ($h_t$) by applying a function to the sum of the previous hidden vector ($h_{t-1}$) multiplied by a weight vector ($W_{state}$) and the current input data ($x_t$) multiplied by another weight vector ($W_{input}$). The function may be a non-linear activation function, such as, for example, ReLu, tanh( ) etc., applied element-by-element. The output of each recurrent node ($y_t$) is the product of the hidden vector multiplied by another weight vector ($W_{output}$). One or more additional, fully-connected, hidden (recurrent) layers 40 may follow hidden (recurrent) layer 30, and may include one or more hidden (recurrent) nodes 46, 47, 48, etc. Hidden layer 50 is a fully-connected layer that includes one or more hidden nodes 51, 52, 53, etc. In certain embodiments, hidden layer 50 may be a classification layer.

Output layer 60 is a fully-connected layer that includes one or more output nodes 61, 62, etc. In certain embodiments, fully-connected output layer 60 may receive the classification results output by hidden layer 50, and each output node provides an output, such as a predicted class score, probability of a word, sentence, etc. A normalization function, such as a Softmax function, may be applied to the output by output layer 60, or, alternatively, by an additional layer interposed between hidden layer 50 and output layer 60.

Similar to ANNs, training an RNN includes optimizing the connection weights between nodes by minimizing the prediction error of the output data until the RNN achieves a particular level of accuracy. As noted above, backpropagation through time may be used to iteratively and recursively determines a gradient descent with respect to the weights, and then adjusts the weights to improve the performance of the RNN.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLu function as the activation function. In certain embodiments, the activation function is provided in a separate activation layer, such as, for example, a ReLu layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 3:
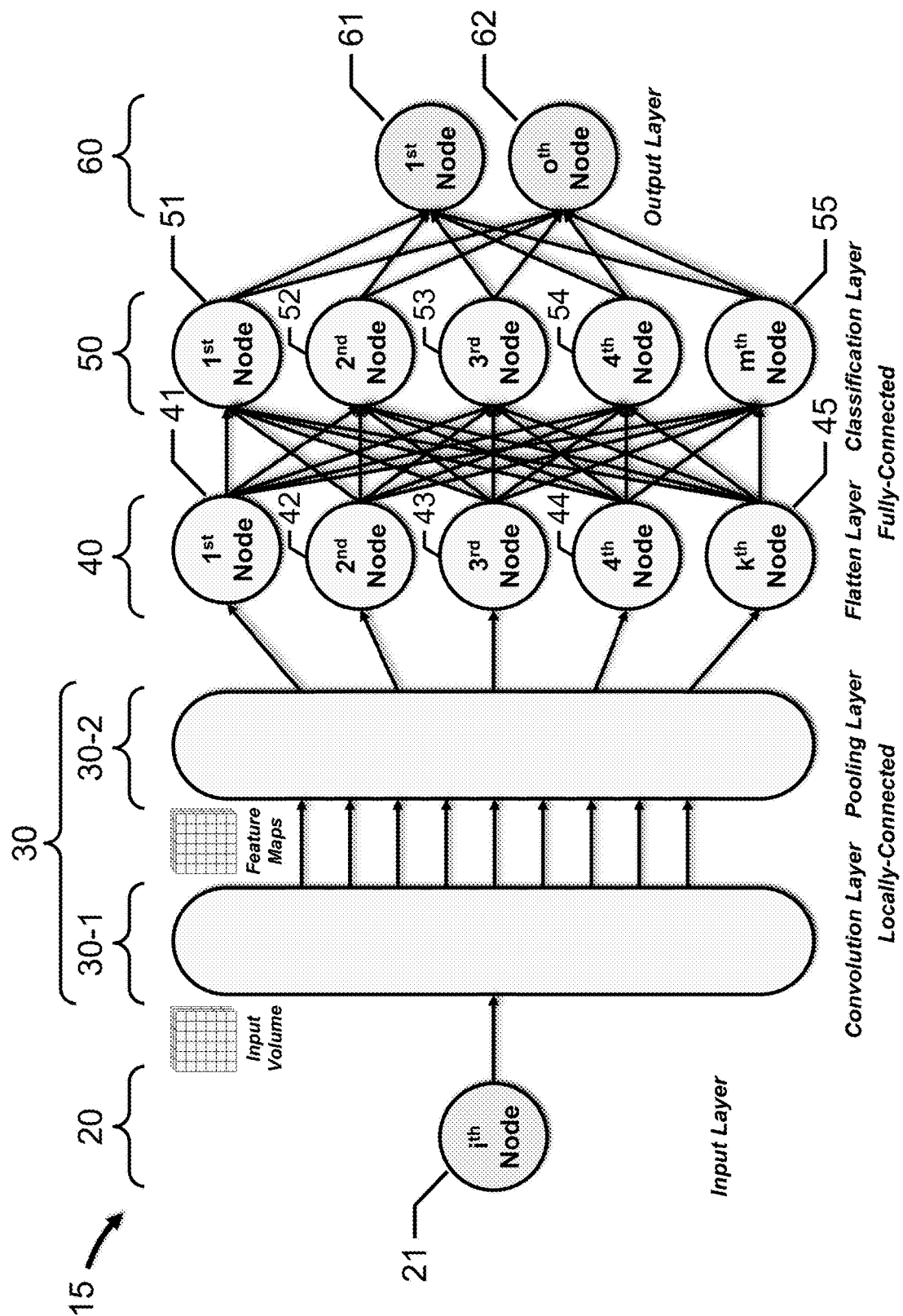
FIG. 3 depicts a convolutional neural network (CNN), in accordance with an embodiment of the present disclosure.

FIG. 3 depicts a CNN, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLu layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLu layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten)

layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by ANNs, CNNs, etc.

Figure 4:
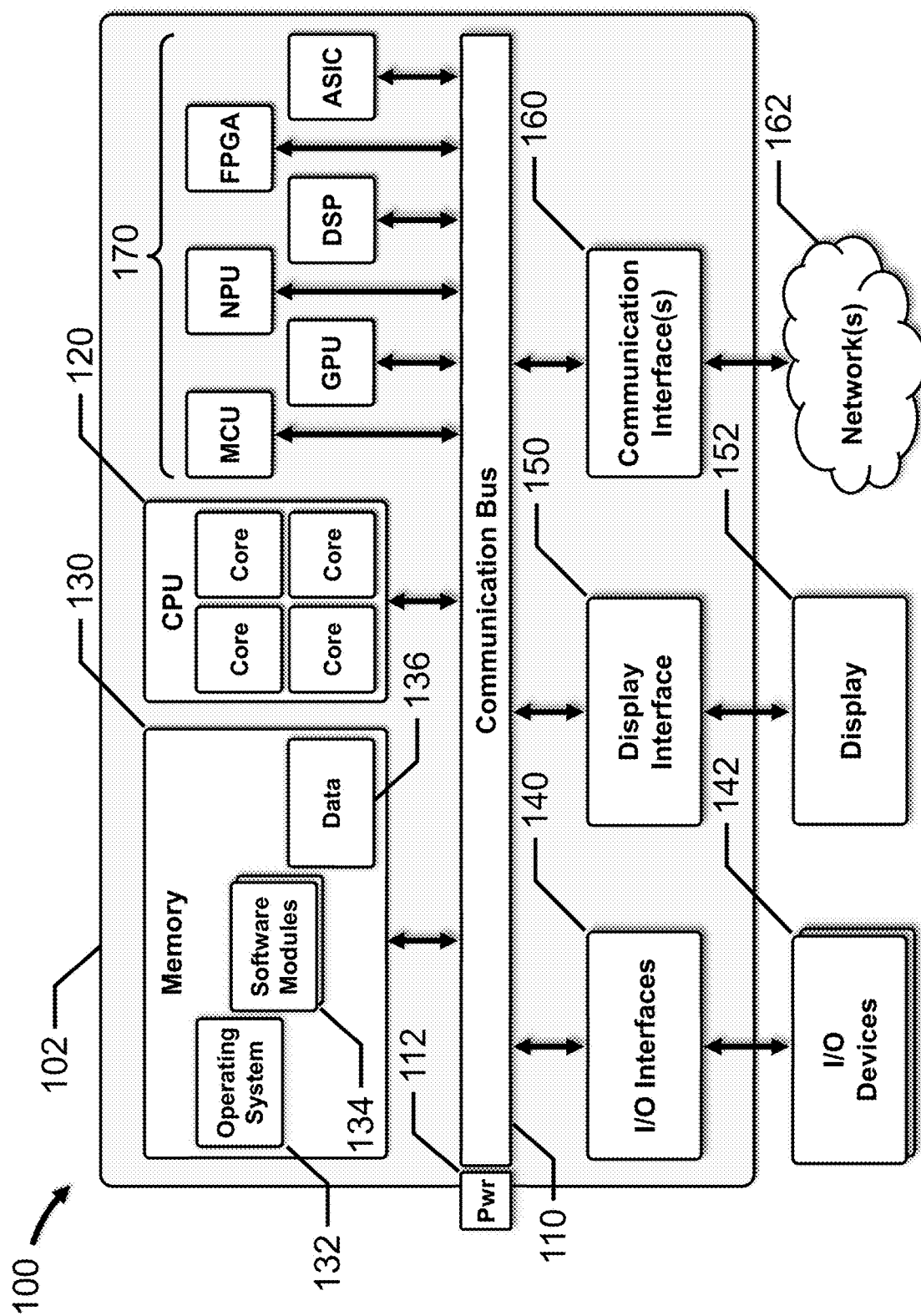
FIG. 4 depicts a block diagram of a system, in accordance with embodiments of the present disclosure.

FIG. 4 depicts a block diagram of system, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Communication bus 110 is a communication system that transfers data between processor 120, memory 130, I/O interfaces 140, display interface 150, communication interface 160, HAs 170, as well as other components not depicted in FIG. 4. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 4. Generally, system 100 may include one or more processors 120, each containing one or more processing cores.

For example, system 100 may include 2 processors 120, each containing multiple processing cores. In certain embodiments, the CPUs form a heterogeneous processing architecture, such as, for example, Arm's "big.LITTLE" architecture, that couples relatively battery-saving and slower processor cores ("LITTLE" cores) with relatively more powerful and power-hungry processing cores ("big" cores). For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc.

In many embodiments, processor 120 may also be configured to execute classification-based machine learning models, such as, for example, ANNs, DNNs, CNNs, RNNs, SVM, Naïve Bayes etc. In these embodiments, processor 120 may provide the same functionality as a hardware accelerator, such as HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute machine learning models, such as, for example, ANNs, CNNs, RNNs, etc., in support of various applications embodied by software modules 134. Generally, HA 170 includes one or more processors, coprocessors, processing engines (PEs), compute engines (CEs), etc., such as, for example, CPUs, MCUs, GPUs, NPUs, such as, for example, the ARM Machine Learning (ML) Processor, DSPs, field programmable gate arrays (FPGAs), application specific integrated circuits (ASICs), controllers, microcontrollers, matrix multiplier circuits, MAC arrays, etc. HAs 170 also include a communications bus interface as well as non-volatile and/or volatile memories, such as, for example, ROM, flash memory, SRAM, DRAM, etc. In certain embodiments, HAs 170 may store ANN models and weights in non-volatile memory, while in other embodiments, HAs 170 receive the ANN model and weights from memory 130 over communication bus 110 for storage in local volatile memory (e.g., local SRAM). In certain embodiments, the ANN model may be directly implemented in hardware using PEs, CEs, matrix multiplier units, MAC arrays, etc. Generally, HAs 170 receive input data from memory 130 over communication bus 110, and transmit output data to memory 130 over communication bus 110.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

Figure 5A:
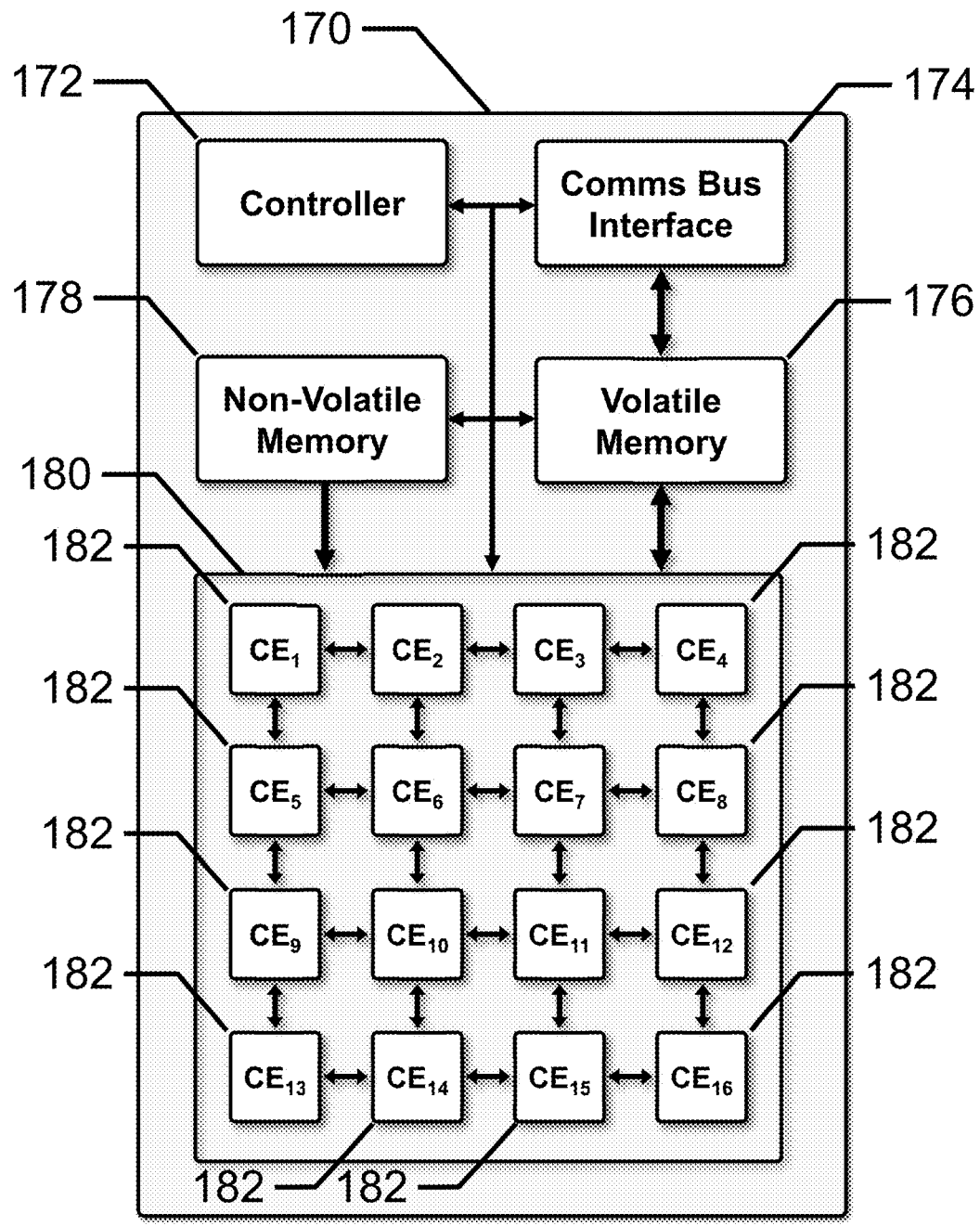
FIG. 5A depicts a block diagram of a hardware accelerator, in accordance with embodiments of the present disclosure.

FIG. 5A depicts a block diagram of a hardware accelerator, in accordance with embodiments of the present disclosure. HA 170 includes controller 172, communication bus interface 174, volatile memory 176 (e.g., SRAM, etc.), non-volatile memory 178 (e.g., ROM, flash, etc.), and CE array 180. CE array 180 includes a number of interconnected CEs 182, such as 4 CEs, 8 CEs, 16 CEs (depicted in FIG. 5), 32 CEs, etc. CEs 182 may be interconnected by a NoC using a ring topology, a star topology, a mesh topology, etc. Alternatively, CEs 182 may be interconnected using a crossbar switch, direct connections, etc. Generally, each CE 182 may execute a portion of an ANN model using a portion of the ANN weight. Similarly, each CE 182 may execute a portion of the LM using a portion of the LM weights.

Figure 5B:
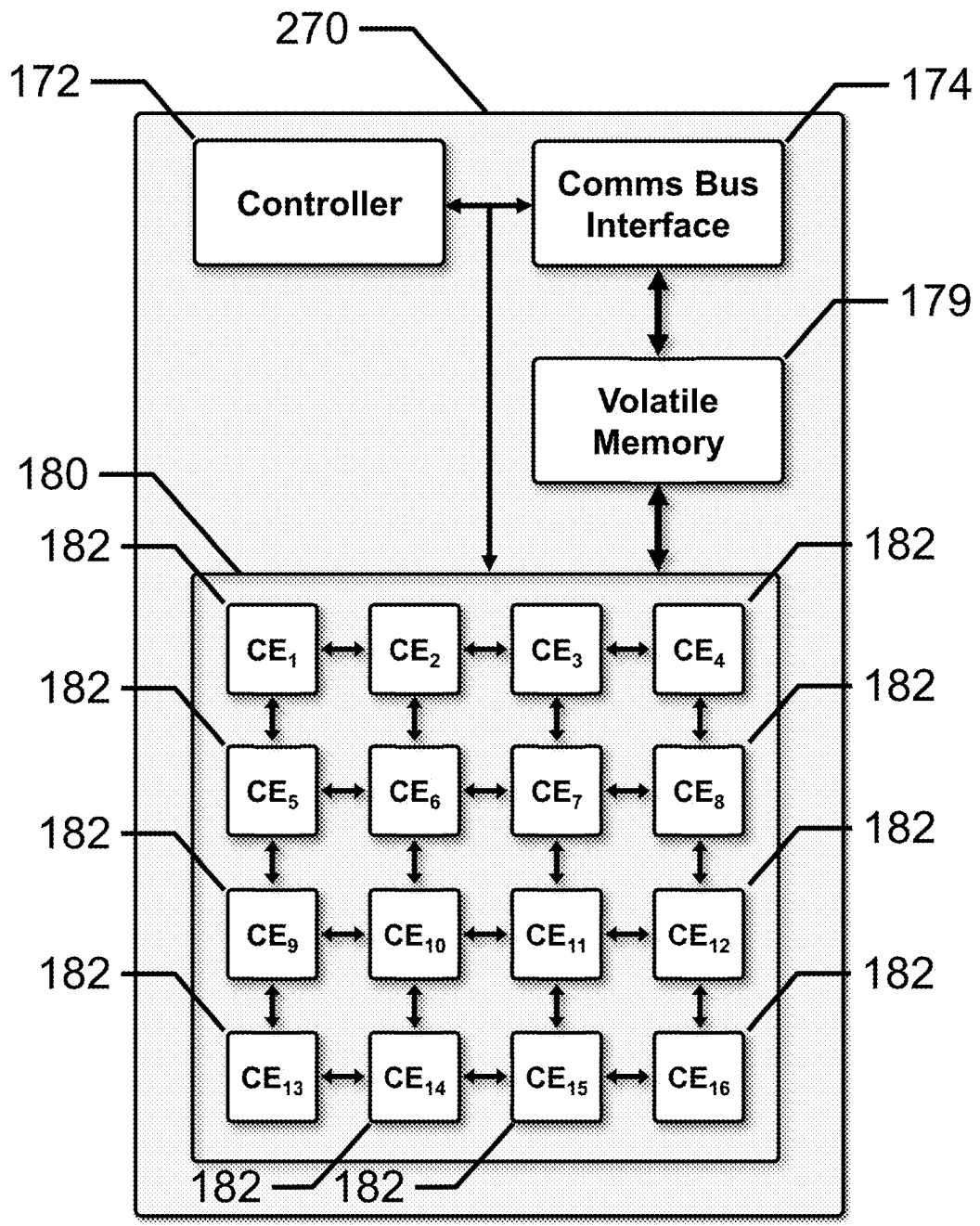
FIG. 5B depicts a block diagram of a hardware accelerator, in accordance with alternative embodiments of the present disclosure.

FIG. 5B depicts a block diagram of a hardware accelerator, in accordance with alternative embodiments of the present disclosure. HA 270 includes controller 172, communication bus interface 174, volatile memory 179 (e.g., SRAM, etc.) and CE array 180. The difference between HA 270 and HA 170 is that volatile memory 179 replaces volatile memory 176 and non-volatile memory 178. Viewed from a functional perspective, one portion of volatile memory 179 may perform the functionality of volatile memory 176, while another portion of volatile memory 179 may perform the functionality of non-volatile memory 178.

Generally, an LM calculates the probability of a sequence of words (e.g., a sentence), and may be used to find the probability of the next word in the sequence (e.g., sentence). LMs may be count-based LMs or continuous-space (neural) LMs (NLMs). Count-based LMs, such as traditional statistical models, etc., estimate probabilities via counting and subsequent smoothing. NLMs, such as RNNs, etc., apply artificial neural network techniques to estimate probabilities.

NLMs input data as a sequence of linguistic units, e.g., words, sentences, etc., using a binary data categorizing technique known as "one hot-encoding," and translate the input data sequence into continuous vectors for further processing. NLMs are typically trained in an unsupervised manner using a large text database. As a result, an NLM understands the context in which a word or sentence appears, as well as other attributes of the word or sentence, such as, for example, whether the word or sentence expresses a positive emotion or negative, whether the word or sentence is an adjective used to describe a person, etc. NLMs may also determine the likelihood that a group of words may be used together, which may be a useful metric against which a text summarizer or speech recognition system may compare its output.

Figure 6A:
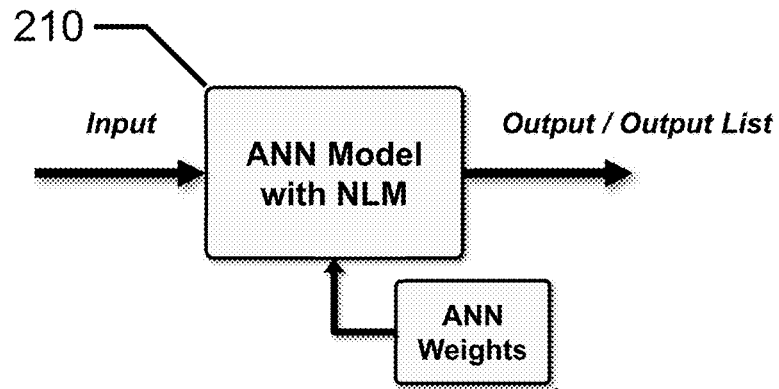
FIG. 6A depicts a data flow diagram for a natural language processing application with an ANN model that includes a neural language model (NLM), in accordance with an embodiment of the present disclosure.

FIG. 6A depicts a data flow diagram for a natural language processing application with an ANN model that includes an NLM, in accordance with an embodiment of the present disclosure.

In this embodiment, the natural language application has an ANN model 210 that includes an NLM. During execution of the natural language application on processor 120, ANN model 210 and ANN weights 212 are first transferred from memory 130 to volatile memory 176, and then the ANN model 210 is executed on HA 170. ANN model 210 receives input data from the natural language application over communications bus 110, processes the input data, and then transmits output or output list data back to the natural language application over communications bus 110.

Figure 6B:
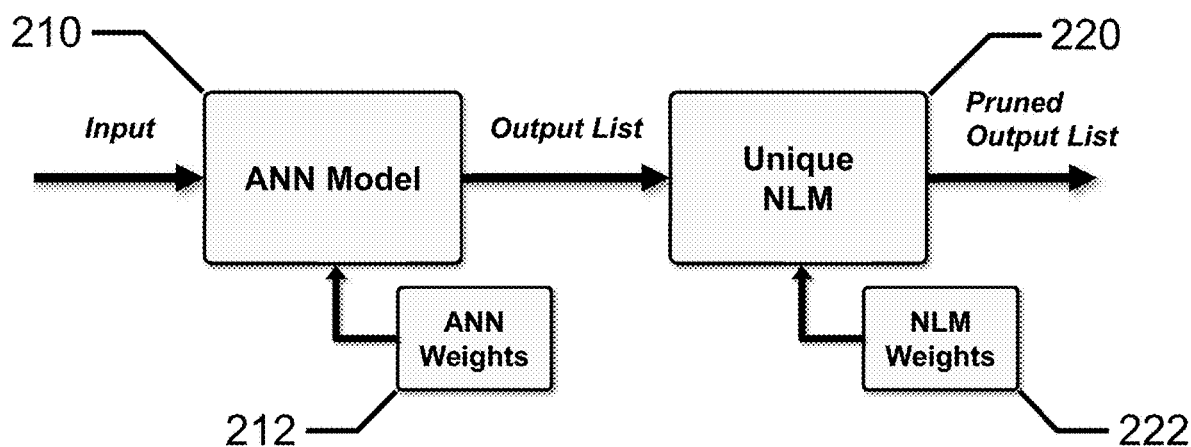
FIG. 6B depicts a data flow diagram for a natural language processing application with an ANN model and a separate, unique NLM, in accordance with an embodiment of the present disclosure.

FIG. 6B depicts a data flow diagram for a natural language processing application with an ANN model and a separate, unique NLM, in accordance with an embodiment of the present disclosure.

In this embodiment, the natural language application has an ANN model 210 and a separate, unique NLM 220. During execution of the natural language application on processor 120, ANN model 210, ANN weights 212, are first transferred from memory 130 to volatile memory 176, and then ANN model 210 is executed on HA 170. ANN model 210 receives input data from the natural language application over communications bus 110, and processes the input data to generate output list data, which is stored in volatile memory on HA 170. Unique NLM 220 and unique NLM weights 222 are then transferred from memory 130 to volatile memory 176, and then unique NLM 220 is executed on HA 170. Unique NLM 220 reads and processes the output list data, and then transmits pruned output list data back to the natural language application over communications bus 110.

Figure 6C:
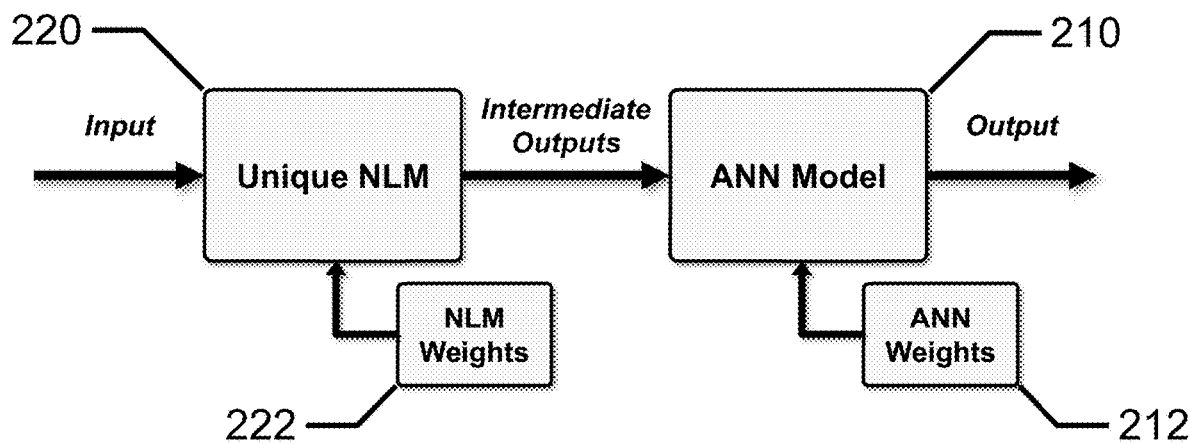
FIG. 6C depicts a data flow diagram for a natural language processing application with an ANN model and a separate, unique NLM, in accordance with an embodiment of the present disclosure.

FIG. 6C depicts a data flow diagram for a natural language processing application with an ANN model and a separate, unique NLM, in accordance with an embodiment of the present disclosure.

In this embodiment, the natural language application has an ANN model 210 and a separate, unique NLM 220. During execution of the natural language application on processor 120, unique NLM 220 and unique NLM weights 222 are first transferred from memory 130 to volatile memory 176, and then unique NLM 220 is executed on HA 170. Unique NLM 220 receives input data from the natural language application over communications bus 110, and processes the input data to generate intermediate output data, which is stored in volatile memory 176. ANN model 210 and ANN weights 212 are then transferred from memory 130 to volatile memory 176, and then ANN model 210 is executed on HA 170. ANN model 210 reads and processes the intermediate output data, and then transmits output data back to the natural language application over communications bus 110.

As noted above, embodiments of the present disclosure advantageously provide an ANN hardware accelerator that stores and executes a configurable NLM. In many embodiments, HA 170 stores a configurable NLM with fixed weights in non-volatile memory 178. During execution of a natural language application on processor 120, the ANN model, ANN weights and a set of associated NLM delta weights are transferred from memory 130 to volatile memory 176. During execution of the configurable NLM on HA 170, the configurable NLM is finetuned to the ANN model by adjusting the NLM fixed weights using the associated NLM delta weights, as discussed in more detail below.

Advantageously, the configurable NLM may be optimized to reduce bandwidth and storage requirements on HA 170, using various techniques, such as, for example, pruning, quantization, etc. Pruning removes unnecessary weights and neural network nodes during the training process, which produces a smaller and faster configurable NLM. Quantization reduces the precision of the data, weights and/or activations by reducing the number of bits used to represent a data value, weight value and/or activation output value, which commensurately reduces the bandwidth and storage required by the configurable NLM.

Fixed point quantization represents data, weights and activations using fixed point values, i.e., integers that have a fixed bitwidth (1 bit, 2 bits, 3 bits, 4 bits, etc.), rather than floating point numbers. In certain embodiments, quantization of the weights and activations from 32 bit floating point numbers to 8 bit integers does not incur a significant loss in accuracy. Binary quantization represents weights as binary values (−1,1), while ternary quantization represents weights as ternary values (−1,0,1). Advantageously, binary and ternary weight quantization reduces many hidden layer calculations to additions and subtractions only (i.e., no multiplications), and activations may also be quantized to produce binary outputs as well.

Figure 7A:
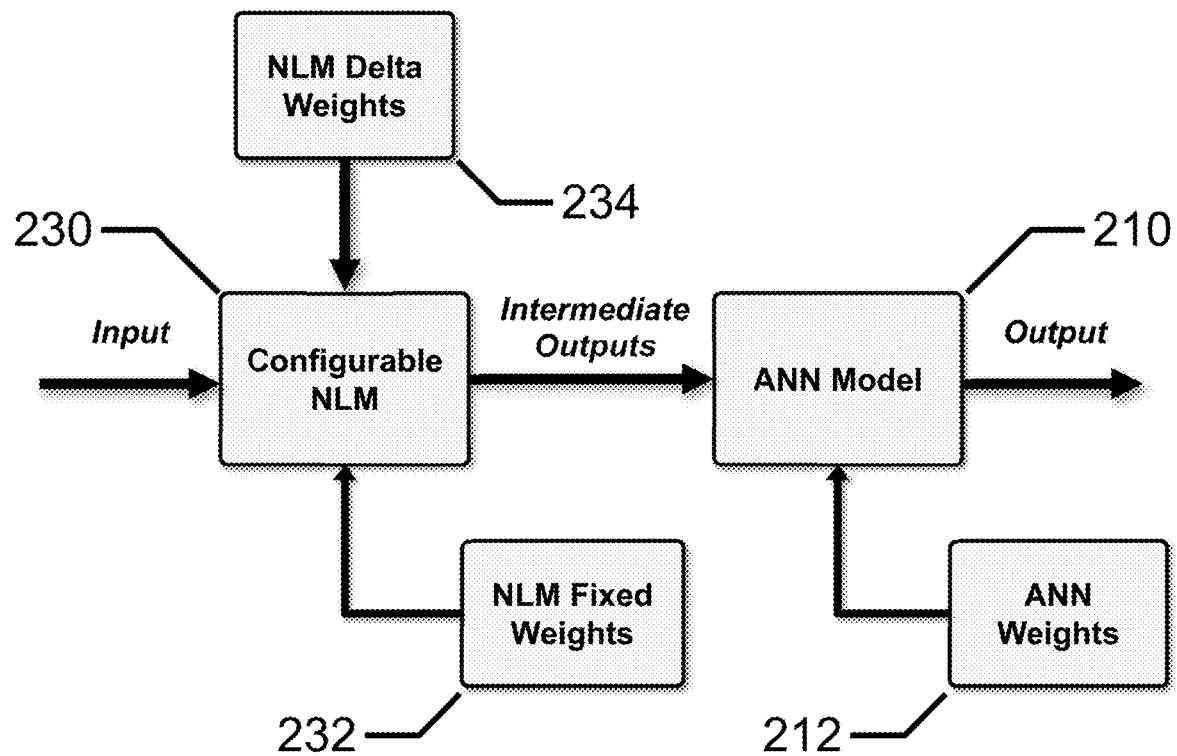
FIGS. 7A and 7B depict data flow diagrams for a natural language processing application with an ANN model and a configurable NLM, in accordance with embodiments of the present disclosure.
Figure 7B:
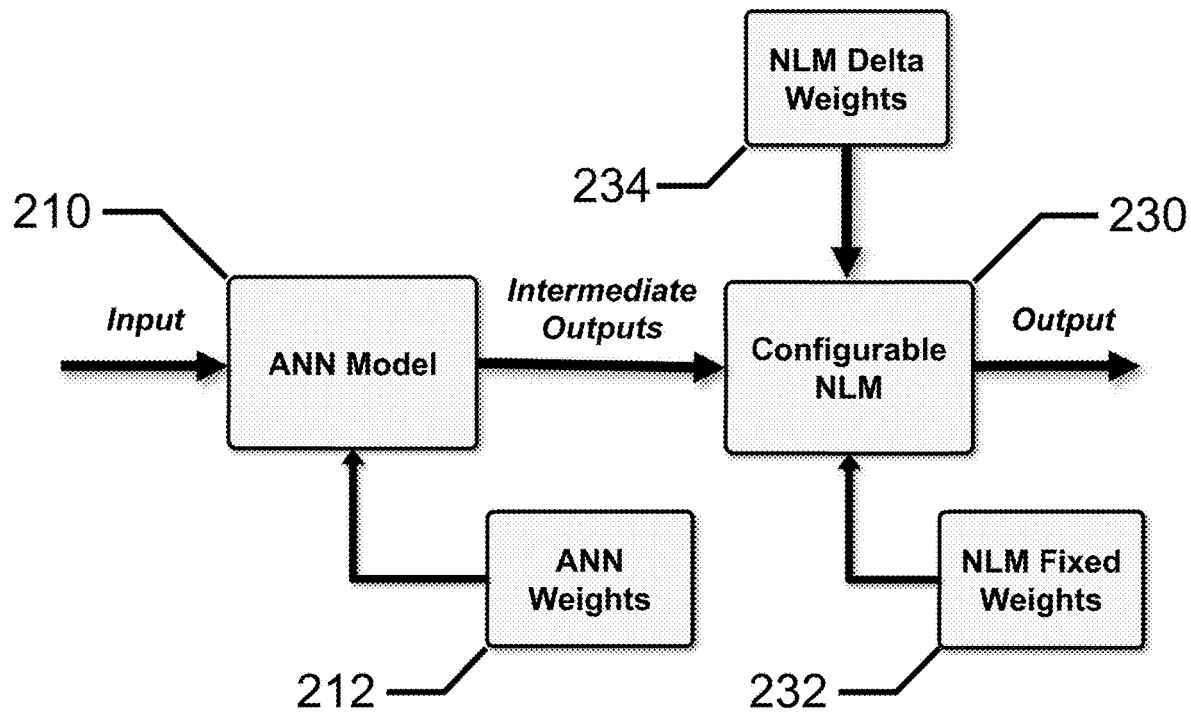

FIGS. 7A and 7B depict data flow diagrams for a natural language processing application with an ANN model and a configurable NLM, in accordance with embodiments of the present disclosure.

In many embodiments, the natural language application has an ANN model 210 and a configurable NLM 230. During execution of the natural language application on processor 120, ANN model 210, ANN weights 212 and NLM delta weights 234 are transferred from memory 130 to volatile memory 176, NLM delta weights 234 are applied to NLM fixed weights 232, and then ANN model 210 and configurable NLM 230 are executed on HA 170. Configurable NLM 230 may be executed directly from non-volatile memory 178 or loaded into volatile memory 176 from non-volatile memory 178. Similarly, NLM fixed weights 232 may be accessed directly from non-volatile memory 178 or loaded in volatile memory 176 from non-volatile memory 178.

In alternative embodiments, during execution of the natural language application on processor 120, ANN model 210, ANN weights 212, NLM delta weights 234, configurable NLM 230 and NLM fixed weights 232 are transferred from memory 130 to volatile memory 179, NLM delta weights 234 are applied to NLM fixed weights 232, and then ANN model 210 and configurable NLM 230 are executed on HA 270.

As depicted in FIG. 7A, configurable NLM 230 may receive input data from the natural language application over communications bus 110, and processes the input data to generate intermediate output data. ANN model 210 then receives and processes the intermediate output data, and transmits output data back to the natural language application over communications bus 110. As depicted in FIG. 7B, ANN model 210 may receive input data from the natural language application over communications bus 110, and then process the input data to generate intermediate output data. Configurable NLM 230 then receives and processes the intermediate output data, and transmits output data back to the natural language application over communications bus 110.

To execute ANN model 210, controller 172 transfers this model to CE array 180 for processing by one or more CEs 182, and the appropriate ANN weights 212 are provided to the appropriate CE 182. Similarly, to execute configurable NLM 230, controller 172 transfers this model to CE array 180 for processing by one or more CEs 182, and the appropriate NLM fixed weights 232 and NLM delta weights 234 are provided to the appropriate CE 182.

NLM delta weights 234 may be applied to NLM fixed weights 232 using various techniques. In certain embodiments, NLM delta weight values may be added to corresponding NLM fixed weight values. Each delta weight value is determined during training; in some embodiments, the addition is low precision. In other embodiments, NLM fixed weight values may be scaled, such as, for example, right-shifted or left-shifted by a particular number of bits, i.e., a bit number. In this example, the NLM delta weights values are the number of bits that the corresponding NLM fixed weight is to be left or right shifted. In further embodiments, a bias may be added to the final output of a multiply accumulate value when the NLM fixed weight values are combined with the input.

Figure 8A:
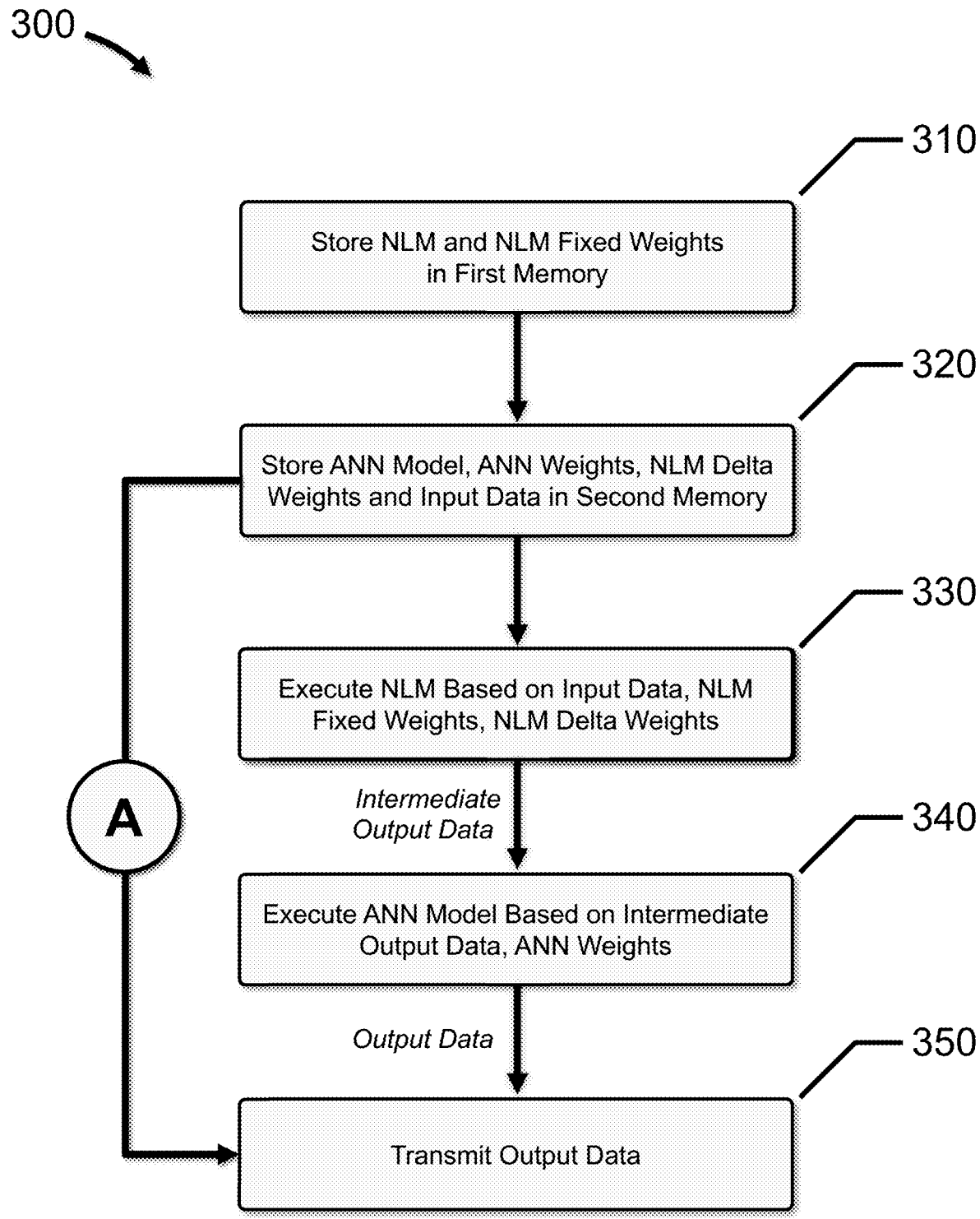
FIGS. 8A and 8B depict flow diagrams presenting functionality for accelerating a natural language processing application using a hardware accelerator, in accordance with embodiments of the present disclosure.

FIG. 8A depicts a flow diagram 300 presenting functionality for accelerating a natural language processing application using a hardware accelerator, in accordance with embodiments of the present disclosure.

At 310, a configurable neural language model (NLM) and a set of NLM fixed weights is stored in a first memory.

At 320, an artificial neural network (ANN) model, a set of ANN weights, a set of NLM delta weights associated with the ANN model, and input data, received over a communication bus, is stored in a second memory. Each NLM delta weight corresponds to an NLM fixed weight.

At 330, the NLM is executed, by at least one computing engine (CE), based on the input data, the set of NLM fixed weights and the set of NLM delta weights, to generate intermediate output data.

At 340, the ANN model is executed by the least one CE, based on the intermediate output data and the plurality of ANN weights, to generate the output data.

At 350, the output data is transmitted over the communications bus.

Figure 8B:
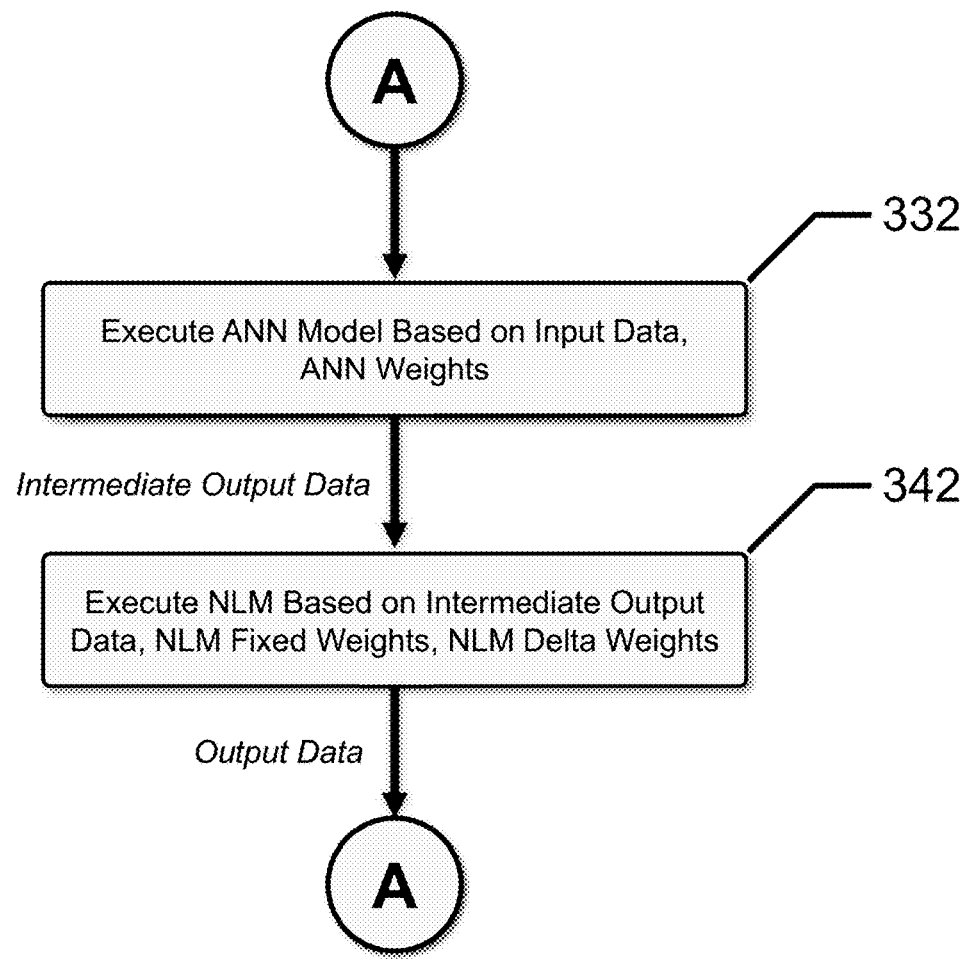

FIG. 8B depicts a flow diagram 302 presenting further functionality for accelerating a natural language processing application using a hardware accelerator, in accordance with other embodiments of the present disclosure.

After 320 (FIG. 8A), processing flows to 332, at which the ANN model is executed by the least one CE, based on the input data and the plurality of ANN weights, to generate intermediate output data.

At 342, the NLM is executed, by at least one computing engine (CE), based on the intermediate output data, the set of NLM fixed weights and the set of NLM delta weights, to generate the output data. Processing then flows to 350 (FIG. 8A).

Embodiments of the present disclosure advantageously provide an ANN hardware accelerator for natural language processing applications that stores and executes a configurable NLM. More particularly, the ANN hardware accelerator stores the configurable NLM and a set of NLM fixed weights in non-volatile memory. During execution of a natural language processing application, the ANN model, ANN weights and a set of associated NLM delta weights are downloaded from system memory to volatile memory on ANN hardware accelerator. During execution of the configurable NLM on the ANN hardware accelerator, the configurable NLM is finetuned to the ANN model by adjusting the NLM fixed weights using the set of associated NLM delta weights. The embodiments described herein are combinable.

In certain embodiments, an ANN hardware accelerator for a natural language processing application includes a communication bus interface, a first memory coupled to the communication bus interface, a second memory coupled to the communication bus interface, a controller coupled to the communication bus interface, the first memory and the second memory, and at least one CE coupled to the first memory, the second memory and the controller. The communication bus interface is configured to receive an ANN model, a set of ANN weights, a set of NLM delta weights associated with the ANN model, and input data, and transmit output data. The first memory is configured to store a configurable NLM and a set of NLM fixed weights. The second memory is configured to store the ANN model, the set of ANN weights, the set of NLM delta weights, the input data and the output data. Each NLM delta weight corresponds to an NLM fixed weight.

In one embodiment, the CE is configured to execute the NLM, based on the input data, the set of NLM fixed weights and the set of NLM delta weights, to generate intermediate output data, and execute the ANN model, based on the intermediate output data and the set of ANN weights, to generate the output data. In another embodiment, the CE is configured to execute the ANN model, based on the input data and the set of ANN weights, to generate the intermediate output data, and execute the NLM, based on the intermediate output data, the set of NLM fixed weights and the set of NLM delta weights, to generate the output data.

In another embodiment, the first memory is a non-volatile memory and the second memory is a volatile memory; or the communication bus interface is further configured to receive the configurable NLM and the set of NLM fixed weights, and the first memory and the second memory are portions of a volatile memory.

In another embodiment, the set of NLM fixed weights has a first number of first weights each first weight having a first bitwidth; the set of NLM delta weights has a second number of second weights each second weight having a second bitwidth; and the second number is less than the first number and the second bitwidth is the same as the first bitwidth, or the second number is the same as the first number, and the second bitwidth is less than the first bitwidth.

In another embodiment, the at least one CE is further configured to add each NLM delta weight to a corresponding NLM fixed weight.

In another embodiment, each NLM delta weight includes a bit number, and the at least one CE is further configured to right-shift or left-shift each NLM fixed weight based on the bit number of the corresponding NLM delta weight.

In another embodiment, each NLM delta weight includes a bias value, and, when the corresponding NLM fixed weight is applied to an input value at a node of the NLM, the at least one CE is further configured to add the bias value to an output value of the node.

In another embodiment, the ANN model is a convolutional neural network (CNN), a recurrent neural network (RNN), a long short term memory (LSTM) model, a memory-augmented neural network (MANN), a transformer neural network, or a gated recurrent unit (GRU) neural network.

In another embodiment, the at least one CE includes a plurality of interconnected CEs, and each CE executes a portion of the NLM using a portion of the set of NLM fixed weights and a portion of the set of NLM delta weights.

In another embodiment, the at least one CE includes a plurality of interconnected CEs, and each CE executes a portion of the ANN model using a portion of the set of ANN weights.

In another embodiment, the at least one CE is further configured to execute the ANN model, based on the input data and the set of ANN weights, to generate intermediate output data; and execute the NLM, based on the intermediate output data, the set of NLM fixed weights and the set of NLM delta weights, to generate the output data.

In certain further embodiments, a method for accelerating a natural language processing application using a hardware accelerator includes storing, in a first memory, a configurable NLM and a set of NLM fixed weights; storing, in a second memory, an artificial neural network (ANN) model, a set of ANN weights, a set of NLM delta weights associated with the ANN model, and input data received over a communication bus, each NLM delta weight corresponding to an NLM fixed weight.

In one embodiment, the method includes executing, by at least one CE, the NLM, based on the input data, the set of NLM fixed weights and the set of NLM delta weights, to generate first intermediate output data, and executing, by the least one CE, the ANN model, based on the first intermediate output data and the set of ANN weights, to generate output data. In another embodiment, the method includes executing, by the least one CE, the ANN model, based on the input data and the set of ANN weights, to generate second intermediate output data, and executing, by at least one CE, the NLM, based on the second intermediate output data, the set of NLM fixed weights and the set of NLM delta weights, to generate the output data.

The method then includes transmitting the output data over the communications bus.

In another embodiment, the first memory is a non-volatile memory and the second memory is a volatile memory; or the first memory and the second memory are portions of a volatile memory.

In another embodiment, the set of NLM fixed weights has a first number of first weights each first weight having a first bitwidth; the set of NLM delta weights has a second number of second weights each second weight having a second bitwidth; and the second number is less than the first number and the second bitwidth is the same as the first bitwidth, or the second number is the same as the first number, and the second bitwidth is less than the first bitwidth.

In another embodiment, the method further comprises adding, by the at least one CE, each NLM delta weight to a corresponding NLM fixed weight.

In another embodiment, each NLM delta weight includes a bit number, and the method further comprises right-shifting or left-shifting, by the at least one CE, each NLM fixed weight based on the bit number of the corresponding NLM delta weight.

In another embodiment, each NLM delta weight includes a bias value, and the method further comprises, when the corresponding NLM fixed weight is applied to an input value at a node of the NLM, adding, by the at least one CE, the bias value to an output value of the node.

In another embodiment, the ANN model is a convolutional neural network (CNN), a recurrent neural network (RNN), a long short term memory (LSTM) model, a memory-augmented neural network (MANN), a transformer neural network, or a gated recurrent unit (GRU) neural network.

In another embodiment, the at least one CE includes a plurality of interconnected CEs, and the method further comprises executing, by each CE, a portion of the NLM using a portion of the set of NLM fixed weights and a portion of the set of NLM delta weights.

In another embodiment, the at least one CE includes a plurality of interconnected CEs, and the method further comprises executing, by each CE, a portion of the ANN model using a portion of the set of ANN weights.

In another embodiment, the method further comprises executing, by the at least one CE, the ANN model, based on the input data and the set of ANN weights, to generate intermediate output data; and executing, by the at least one CE, the NLM, based on the intermediate output data, the set of NLM fixed weights and the set of NLM delta weights, to generate the output data.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hardware accelerator for a natural language processing application, comprising:
a communication bus interface configured to:
receive an artificial neural network (ANN) model, a set of ANN weights, a set of neural language model (NLM) delta weights associated with the ANN model, and input data, and
transmit output data;
a first memory, coupled to the communication bus interface, configured to store a configurable NLM and a set of NLM fixed weights;
a second memory, coupled to the communication bus interface, configured to store the ANN model, the set of ANN weights, the set of NLM delta weights, the input data and the output data, each NLM delta weight corresponding to an NLM fixed weight;
a controller coupled to the communication bus interface, the first memory and the second memory; and
at least one computing engine (CE), coupled to the first memory, the second memory and the controller, configured to:
execute the NLM, based on the input data, the set of NLM fixed weights and the set of NLM delta weights, to generate intermediate output data, and execute the ANN model, based on the intermediate output data and the set of ANN weights, to generate the output data; or
execute the ANN model, based on the input data and the set of ANN weights, to generate the intermediate output data, and execute the NLM, based on the intermediate output data, the set of NLM fixed weights and the set of NLM delta weights, to generate the output data.

2. The hardware accelerator of claim 1, where:
the first memory is a non-volatile memory and the second memory is a volatile memory; or
the communication bus interface is further configured to receive the configurable NLM and the set of NLM fixed weights, and the first memory and the second memory are portions of a volatile memory.

3. The hardware accelerator of claim 2, where the set of NLM fixed weights has a first number of first weights, each first weight having a first bitwidth, where the set of NLM delta weights has a second number of second weights, each second weight having a second bitwidth, and where:
the second number is less than the first number, and the second bitwidth is the same as the first bitwidth; or
the second number is the same as the first number, and the second bitwidth is less than the first bitwidth.

4. The hardware accelerator of claim 3, where the at least one CE is further configured to add each NLM delta weight to a corresponding NLM fixed weight.

5. The hardware accelerator of claim 3, where each NLM delta weight includes a bit number, and the at least one CE is further configured to right-shift or left-shift each NLM fixed weight based on the bit number of the corresponding NLM delta weight.

6. The hardware accelerator of claim 3, where each NLM delta weight includes a bias value, and, when the corresponding NLM fixed weight is applied to an input value at a node of the NLM, the at least one CE is further configured to add the bias value to an output value of the node.

7. The hardware accelerator of claim 1, where the ANN model is a convolutional neural network (CNN), a recurrent neural network (RNN), a long short term memory (LSTM) model, a memory-augmented neural network (MANN), a transformer neural network, or a gated recurrent unit (GRU) neural network.

8. The hardware accelerator of claim 7, where the at least one CE includes a plurality of interconnected CEs, and each CE executes a portion of the NLM using a portion of the set of NLM fixed weights and a portion of the set of NLM delta weights.

9. The hardware accelerator of claim 8, where the at least one CE includes a plurality of interconnected CEs, and each CE executes a portion of the ANN model using a portion of the set of ANN weights.

10. The hardware accelerator of claim 1, where the at least one CE is further configured to:
execute the NLM, based on the input data, the set of NLM fixed weights and the set of NLM delta weights, to generate the intermediate output data; and
execute the ANN model, based on the intermediate output data and the set of ANN weights, to generate the output data.

11. A method for accelerating a natural language processing application using a hardware accelerator, comprising:
storing, in a first memory, a configurable neural language model (NLM) and a set of NLM fixed weights;
storing, in a second memory, an artificial neural network (ANN) model, a set of ANN weights, a set of NLM delta weights associated with the ANN model, and input data received over a communication bus, each NLM delta weight corresponding to an NLM fixed weight;
executing, by at least one computing engine (CE), the NLM, based on the input data, the set of NLM fixed weights and the set of NLM delta weights, to generate first intermediate output data, or executing, by the least one CE, the ANN model, based on the input data and the set of ANN weights, to generate second intermediate output data;
executing, by the least one CE, the ANN model, based on the first intermediate output data and the set of ANN weights, to generate output data, or executing, by the least one CE, the NLM, based on the second intermediate output data, the set of NLM fixed weights and the set of NLM delta weights, to generate the output data; and
transmitting the output data over the communications bus.

12. The method of claim 11, where the first memory is a non-volatile memory and the second memory is a volatile memory, or the first memory and the second memory are portions of a volatile memory.

13. The method of claim 12, where the set of NLM fixed weights has a first number of first weights, each first weight having a first bitwidth, where the set of NLM delta weights has a second number of second weights, each second weight having a second bitwidth, and where:
the second number is less than the first number, and the second bitwidth is the same as the first bitwidth; or
the second number is the same as the first number, and the second bitwidth is less than the first bitwidth.

14. The method of claim 13, further comprising adding, by the at least one CE, each NLM delta weight to a corresponding NLM fixed weight.

15. The method of claim 13, where each NLM delta weight includes a bit number, and the method further comprises right-shifting or left-shifting, by the at least one CE, each NLM fixed weight based on the bit number of the corresponding NLM delta weight.

16. The method of claim 13, where each NLM delta weight includes a bias value, and the method further comprises, when the corresponding NLM fixed weight is applied to an input value at a node of the NLM, adding, by the at least one CE, the bias value to an output value of the node.

17. The method of claim 11, where the ANN model is a convolutional neural network (CNN), a recurrent neural network (RNN), a long short term memory (LSTM) model, a memory-augmented neural network (MANN), a transformer neural network, or a gated recurrent unit (GRU) neural network.

18. The method of claim 17, where the at least one CE includes a plurality of interconnected CEs, and the method further comprises executing, by each CE, a portion of the NLM using a portion of the set of NLM fixed weights and a portion of the set of NLM delta weights.

19. The method of claim 18, where the at least one CE includes a plurality of interconnected CEs, and the method further comprises executing, by each CE, a portion of the ANN model using a portion of the set of ANN weights.

20. The method of claim 11, further comprising:
   executing the NLM, based on the input data, the set of NLM fixed weights and the set of NLM delta weights, to generate the intermediate output data; and
   executing the ANN model, based on the intermediate output data and the set of ANN weights, to generate the output data.

* * * * *